(12) United States Patent
Takahashi et al.

(10) Patent No.: US 11,997,701 B2
(45) Date of Patent: May 28, 2024

(54) TERMINAL, RADIO COMMUNICATION METHOD, AND RADIO COMMUNICATION SYSTEM FOR DETERMINING A CONFIGURATION OF A CONTROL RESOURCE SET

(71) Applicant: NTT DOCOMO, INC., Tokyo (JP)

(72) Inventors: Hideaki Takahashi, Tokyo (JP); Kazuki Takeda, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 539 days.

(21) Appl. No.: 17/280,586

(22) PCT Filed: Sep. 27, 2018

(86) PCT No.: PCT/JP2018/036077
§ 371 (c)(1),
(2) Date: Mar. 26, 2021

(87) PCT Pub. No.: WO2020/065862
PCT Pub. Date: Apr. 2, 2020

(65) Prior Publication Data
US 2021/0377950 A1    Dec. 2, 2021

(51) Int. Cl.
| | |
|---|---|
| *H04W 48/12* | (2009.01) |
| *H04L 5/00* | (2006.01) |
| *H04W 56/00* | (2009.01) |
| *H04W 72/0453* | (2023.01) |
| *H04W 72/23* | (2023.01) |
| *H04W 72/53* | (2023.01) |

(52) U.S. Cl.
CPC ......... *H04W 72/53* (2023.01); *H04W 56/001* (2013.01); *H04W 72/0453* (2013.01); *H04W 72/23* (2023.01)

(58) Field of Classification Search
CPC .............. H04W 72/53; H04W 56/001; H04W 72/0453; H04W 72/23
See application file for complete search history.

(56) References Cited

U.S. PATENT DOCUMENTS

| | | | |
|---|---|---|---|
| 2014/0301296 A1* | 10/2014 | Vos ...................... | H04L 5/0094 |
| | | | 370/329 |
| 2018/0145797 A1* | 5/2018 | Yeo ....................... | H04L 1/1812 |
| 2019/0029005 A1 | 1/2019 | Bendlin et al. | |
| 2019/0069285 A1* | 2/2019 | Chandrasekhar ..... | H04W 72/23 |

(Continued)

FOREIGN PATENT DOCUMENTS

WO     2017123286 A1     7/2017

OTHER PUBLICATIONS

3GPP TSG-RAN WG2 Meeting #104, R2-1816200 Title: proposed Agenda (Year: 2018).*

(Continued)

*Primary Examiner* — Diane L Lo
*Assistant Examiner* — Abusayeed M Haque
(74) *Attorney, Agent, or Firm* — Osha Bergman Watanabe & Burton LLP

(57) ABSTRACT

A user terminal includes a receiving section that receives a master information block (MIB) in a cell, and a control section that determines the MIB or cell-specific configuration information about a downlink control channel to configure a control resource set for a common search space, based on a frequency range of the cell and a value determined based on a first parameter in the MIB.

8 Claims, 9 Drawing Sheets

(56) References Cited

U.S. PATENT DOCUMENTS

2019/0089486 A1* 3/2019 Kim ..................... H04L 1/0072
2019/0394751 A1* 12/2019 Park ................. H04W 72/0453
2020/0220703 A1* 7/2020 Kim ........................ H04L 27/26

OTHER PUBLICATIONS

Extended European Search Report issued in European Application No. 18934763.6 dated May 10, 2022 (9 pages).
NTT Docomo, Inc., "Maintenance for physical downlink control channel", 3GPP TSG RAN WG1 Meeting #94, R1-1809141, Gothenburg, Sweden, Aug. 20-24, 2018 (27 pages).
Nokia, Nokia Shanghai Bell, "Separating CORESET and SearchSpace in MIB", 3GPP TSG-RAN WG2 Meeting NR Adhoc 1807, R2-1810279, Montreal, Canada, Jul. 2-6, 2018 (2 pages).
ZTE Corporation, Sanechips, "Remaining issues for NR ANR reporting" 3GPP TSG-RAN WG2 Meeting #103, R2-1811600, Gothenburg, Sweden, Aug. 20-24, 2018 (4 pages).
1 Office Action issued in Indian Application No. 202117018295 dated Nov. 18, 2022 (7 pages).
Office Action issued in Japanese Application No. 2020-547750; dated May 31, 2022 (6 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
International Search Report issued in International Application No. PCT/JP2018/036077, dated Dec. 18, 2018 (4 pages).
Written Opinion issued in International Application No. PCT/JP2018/036077; dated Dec. 18, 2018 (3 pages).

* cited by examiner

| $k_{SSB}$ | pdcch-ConfigSIB1 | $N_{GSCN}^{Offset}$ |
|---|---|---|
| 24 | 0, 1, ..., 255 | 1, 2, ..., 256 |
| 25 | 0, 1, ..., 255 | 257, 258, ..., 512 |
| 26 | 0, 1, ..., 255 | 513, 514, ..., 768 |
| 27 | 0, 1, ..., 255 | -1, -2, ..., -256 |
| 28 | 0, 1, ..., 255 | -257, -258, ..., -512 |
| 29 | 0, 1, ..., 255 | -513, -514, ..., -768 |
| 30 | 0, 1, ..., 255 | Reserved, Reserved, ..., Reserved |

FIG. 5A

| $k_{SSB}$ | pdcch-ConfigSIB1 | $N_{GSCN}^{Offset}$ |
|---|---|---|
| 12 | 0, 1, ..., 255 | 1, 2, ..., 256 |
| 13 | 0, 1, ..., 255 | -1, -2, ..., -256 |
| 14 | 0, 1, ..., 255 | Reserved, Reserved, ..., Reserved |

FIG. 5B

TERMINAL, RADIO COMMUNICATION METHOD, AND RADIO COMMUNICATION SYSTEM FOR DETERMINING A CONFIGURATION OF A CONTROL RESOURCE SET

TECHNICAL FIELD

The present disclosure relates to a user terminal in next-generation mobile communication systems.

BACKGROUND ART

In the UMTS (Universal Mobile Telecommunications System) network, the specifications of LTE (Long-Term Evolution) have been drafted for the purpose of further increasing high speed data rates, providing lower latency and so on (see Non-Patent Literature 1). In addition, for the purpose of further high capacity, advancement and the like of the LTE (3GPP (Third Generation Partnership Project) Rel. (Release) 8 and Rel. 9), the specifications of LTE-Advanced (3GPP Rel. 10 to Rel. 14) have been drafted.

Successor systems of LTE (e.g., referred to as "5th generation mobile communication system)," "5G+ (plus)," "NR (New Radio)," "3GPP Rel. 15 (or later versions)," and so on) are also under study.

In an initial access in NR, at least one of detection of a synchronization signal block (SSB), acquisition of broadcast information (e.g., master information block (MIB)) transmitted by a broadcast channel (also referred to as a "broadcast channel (PBCH (Physical Broadcast Channel))," "P-BCH," and so on), and establishment of a connection by random access is performed.

Here, the SSB is a signal block including at least one of synchronization signals (e.g., a primary synchronization signal (PSS), a secondary synchronization signal (SSS) and a PBCH and is also referred to as a "SS/PBCH block," and so on.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (hereinafter also referred to as "NR"), it is assumed that a control resource set (CORESET) ford search space (common search space (CSS)) which is common to one or more user terminals (UEs (User Equipments)) are configured for the UEs.

For example, it is studied for the CORESET to be determined based on either a parameter (for example, pdcch-ConfigSIB1) in an MIB or a parameter (for example, controlResourceSetZero) included in configuration information (for example, PDCCH-ConfigCommon) common to cells about a downlink control channel (for example, PDCCH (Physical Downlink Control Channel)).

However, as a result of not being able to appropriately determine whether to refer to a parameter (for example, pdcch-ConfigSIB1) in the MIB or a parameter in the configuration information (for example, PDCCH-ConfigCommon), the UE may not configure a control resource set for a common search space appropriately.

In view of this, an object of the present disclosure is to provide a user terminal which can configure a control resource set for a common search space appropriately.

Solution to Problem

A user terminal according to one aspect of the present disclosure includes a receiving section that receives a master information block (MIB) in a cell, and a control section that determines the MIB or cell-specific configuration information about a downlink control channel to configure a control resource set for a common search space, based on a frequency range of the cell and a value determined based on a first parameter in the MIB.

Advantageous Effects of Invention

According to one aspect of the present disclosure, a control resource set for a common search space is configured appropriately.

BRIEF DESCRIPTION OF DRAWINGS

FIGS. 5A and 5B are diagrams to show examples of $k_{SSB}$ according to one embodiment;

DESCRIPTION OF EMBODIMENTS

CORESET and Search Space

Figure 1:
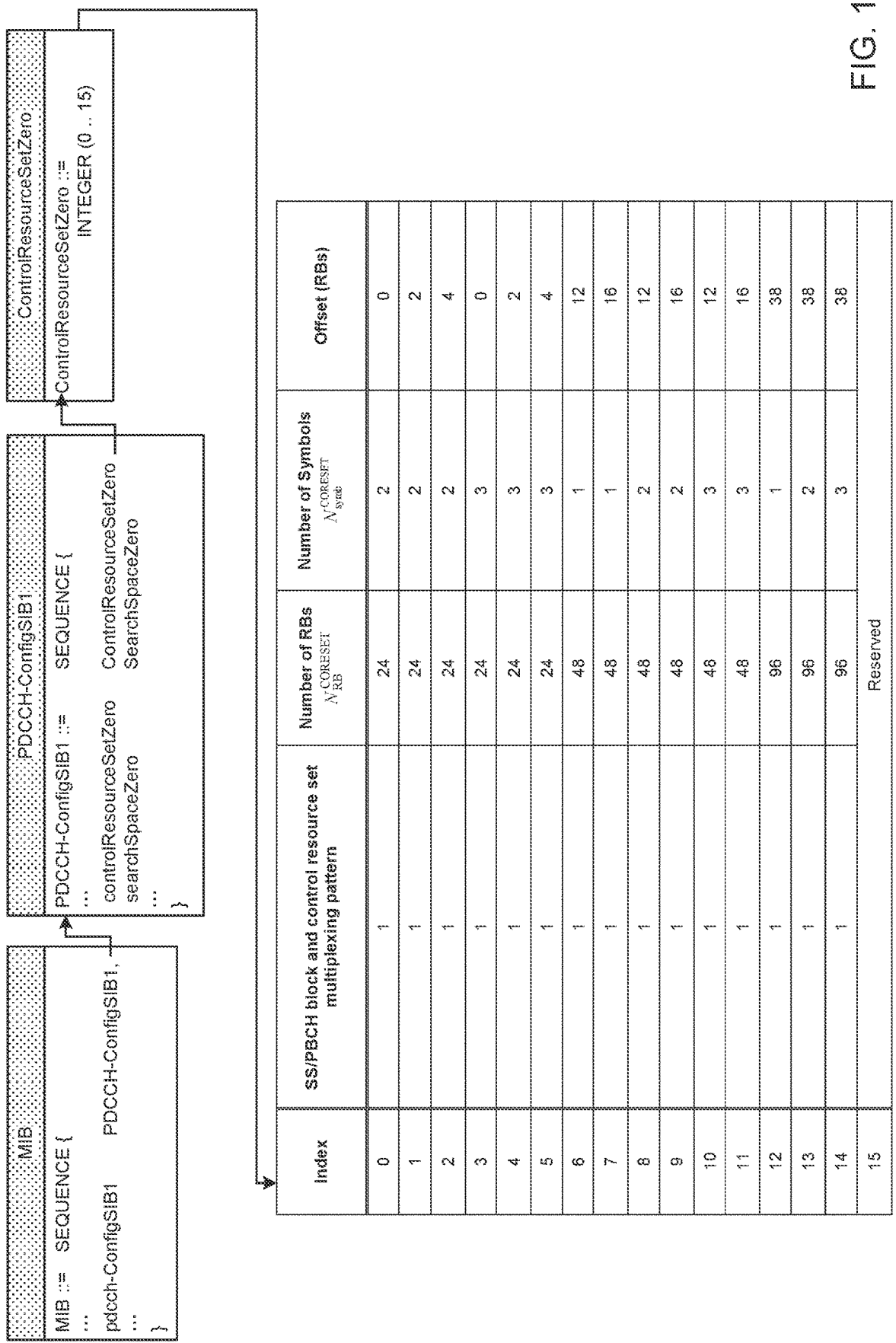
FIG. 1 is a diagram to show an example of a configuration of CORESET #0 based on an MIB.

For future radio communication systems (hereinafter, also referred to as "NR"), it is studied to use a control resource set (CORESET) to transmit a control signal (for example, downlink control information (DCI)) of a physical layer from a base station to a user terminal (UE (User Equipment)).

The CORESET is allocation candidate regions of a downlink control channel (for example, PDCCH (Physical Downlink Control Channel)). The CORESET may be configured to include predetermined frequency-domain resources and time-domain resources (for example, one or two symbols, and the like). The PDCCH (or DCI) is mapped with respect to predetermined resource units in the CORESET.

In NR, a UE monitors (blind-decodes) sets of one or more search spaces (SSs) and detects DCI. The search spaces may include one or more search spaces (common search space (CSS)) used for the monitoring of (cell-specific) DCI which common to one or more UEs and one or more search spaces (user-specific search space (USS)) used for the monitoring of DCI specific to the UE.

CSSs may include following at least one type. Note that the CSSs of each following type may be expressed in other words with a set (CSS set) of one or more CSSs.

Type 0-PDCCH CSS
Type 0A-PDCCH CSS
Type 1-PDCCH CSS
Type 2-PDCCH CSS
Type 3-PDCCH CSS The type 0-PDCCH CSS is used for monitoring of DCI that is cyclic redundancy check (CRC)-scrambled with a predetermined identifier (for example, SI-RNTI (System Information-Radio Network Temporary Identifier)) in a predetermined cell (for example, a primary cell). Note that CRC scrambling means to add (include) CRC bits scrambled (masked) with a predetermined identifier for DCI.

The UE may receive system information block (SIB) 1, based on DCI detected with the type 0-PDCCH CSS. The type 0-PDCCH CSS is also referred to as "search space #0," "common search space #0," an "SS for SIB1," an "SS for RMSI (Remaining Minimum System Information)," and the like.

The type 0-PDCCH CSS may be configured by any of the following parameters (also referred to as "information element (IE)," or simply "information," or the like).

Parameters (for example, the predetermined number of bits in pdcch-ConfigSIB1, or the predetermined number of bits in RMSI-PDCCH-Config) in a master information block (MIB)

Parameters (for example, searchSpaceSIB1 or searchSpaceZero) in cell-specific configuration information (also referred to as "PDCCH-ConfigCommon," and the like) about a PDCCH (note that PDCCH-ConfigCommon may be included in SIB1, or may be radio resource control (RRC)-signaled specific to the UE (may be included in an RRC reconfiguration message).

The type 0A-PDCCH CSS is used for monitoring of DCI CRC-scrambled with a predetermined identifier (for example, SI-RNTI) in a predetermined cell (for example, a primary cell). The type 0A-PDCCH CSS is also referred to as an "SS for OSI (Other System Information)" (for example, SIB2 or later), and the like. The type 0A-PDCCH CSS may be configured by a parameter (for example, searchSpaceOtherSystemInformation) in the above-described PDCCH-ConfigCommon.

The type 1-PDCCH CSS is used for monitoring of DCI CPC-scrambled with a predetermined identifier (for example, RA-RNTI (Random Access-RNTI), TC-RNTI (Temporary Cell-RNTI)) in a predetermined cell (for example, a primary cell). The type 1-PDCCH CSS is also referred to as an "SS for random access (RA)," and the like. The type 0A-PDCCH CSS may be configured by a parameter (for example, ra-SearchSpace) in the above-described PDCCH-ConfigCommon.

The UE may receive a message for an RA procedure (for example, random access response (RAR, message 2)), a message for contention resolution (message 4), and the like, based on DCI detected with the type 1-PDCCH CSS.

The type 2-PDCCH CSS is used for monitoring of DCI CRC-scrambled with a predetermined identifier (for example, P-RNTI (Paging-RNTI)) in a predetermined cell (for example, a primary cell). The type 2-PDCCH CSS is also referred to as an "SS for paging," and the like. The type 2-PDCCH CSS may be configured by a parameter (for example, pagingSearchSpace) in the above-described PDCCH-ConfigCommon. The UE may receive a paging message, based on DCI detected with the type 2-PDCCH CSS.

The type 3-PDCCH CSS is used for monitoring of DCI CRC-scrambled with a predetermined identifier (for example, INT-RNTT (Interruption RNTI) for DL preemption indication, an SFI-RNTI (Slot Format Indicator RNTI) for slot format indication, a TPC-PUSCH-RNTI for transmit power control (TPC) of a PUSCH (Physical Uplink Shared Channel), a TPC-PUCCH-RNTI for TPC of a PUCCH (Physical Uplink Control Channel), a TPC-SRS-RNTI for TPC of an SRS (Sounding Reference Signal), a C-RNTI, an MCS-C-RNTI, a CS-RNTI).

The type 3-PDCCH CSS may be configured by a predetermined parameter (for example, SearchSpace in configuration information (also referred to as "PDCCH-Config," and the like) of a PDCCH where the search space type is common).

A CORESET for these CSSs is also referred to as "CORESET #0," or "common CORESET." CORESET #0 can be configured based on any one of the following parameters (1) to (3) for the UE.

(1) Parameters (for example, the predetermined number of bits of pdcch-ConfigSIB1) in an MIB
(2) Parameters (for example, controlResourceSetZero) in PDCCH-ConfigCommon in an SIB1
(3) Parameters (for example, controlResourceSetZero) in PDCCH-ConfigCommon included in ServingCellConfigCommon RRC-signaled (included in an RRC reconfiguration message) specific to the UE For example, (1) the UE determines information (for example, the number of resource blocks (also referred to as "physical resource blocks (PRBs)" and the like), the number of symbols, offset, and the like) about CORESET #0, based on an index indicated by the predetermined number of most significant bit(s) (MSB) (for example, 4 MSBs) of pdcch-ConfigSIB1 in an MIB.

Note that the number of RBs of CORESET #0 may be referred to as a "bandwidth," a "bandwidth of an initial bandwidth part (initial BWP)," a "frequency domain," and the like.

An MIB may be acquired based on a synchronization signal block (SSB) detected in cell search. Here, an SSB is a block including at least one of a synchronization signal (SS) and a broadcast channel (also referred to as a "PBCH (Physical Broadcast Channel)," and the like). The SSB is also referred to as an "SS/PBCH block," and the like.

For example, the synchronization signal (SS) may be at least one of a primary synchronization signal (PSS) and a secondary synchronization signal (SSS).

In cell search, the UE assumes a period (reception occasion) to receive an SSB. For example, the reception occasion may be a plurality of contiguous symbols. When the UE detects an SS/PBCH, the UE acquires an MIB transmitted (broadcasted) on the PBCH.

FIG. 1 is a diagram to show an example of a configuration of CORESET #0 based on an MIB. As shown in FIG. 1, the MIB may include configuration information (also referred to as "pdcch-ConfigSIB1" or "RMSI-PDCCH-Config," and the like) related to the PDCCH for the system information (for example, SIB1 or RMSI, and the like). Note that parameters in the MIB and the hierarchy structure of the parameters shown in FIG. 1 are only examples, and some parameters (layers) may be omitted or may be added.

As shown in FIG. 1, pdcch-ConfigSIB1 in the MIB may include information (also referred to as "ControlResourceSetZero," and the like) used for the configuration of CORESET #0. For example, in FIG. 1, the UE may configure CORESET #0, based on at least one of the number of RBS ($N^{CORESET}_{RB}$), the number of symbols ($N^{CORESET}_{symb}$), and an offset, associated with an index indicated by ControlResourceSetZero in pdcch-ConfigSIB1.

Alternatively, (2) the UE may determine information about above-described CORESET #0, based on an index indicated by a parameter (for example, controlResourceSetZero) in PDCCH-ConfigCommon in SIB1.

Figure 2:
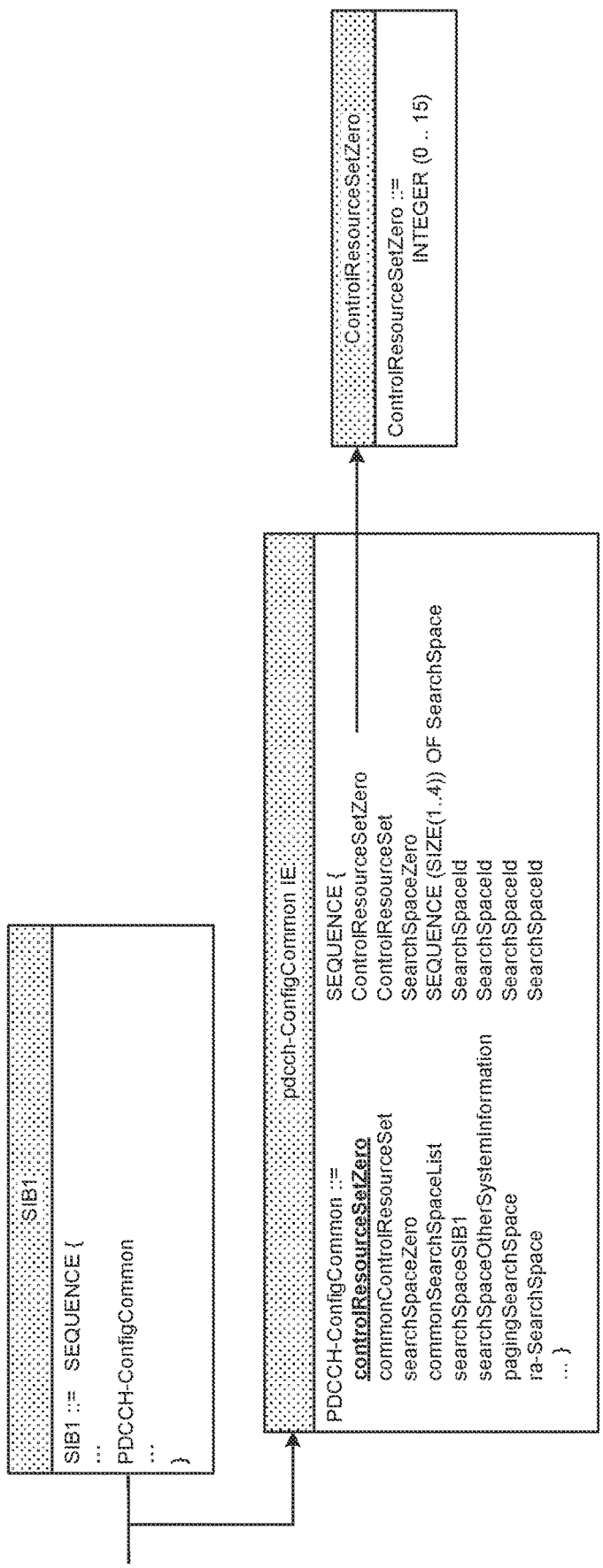
FIG. 2 is a diagram to show an example of a configuration of CORESET #0 based on an SIB1.

FIG. 2 is a diagram to show an example of a configuration of CORESET #0 based on an SIB1. Note that parameters in the SIB1 and the hierarchy structure of the parameters shown in FIG. 2 are only examples, and some parameters (layers) may be omitted or may be added.

As shown in FIG. 2, the SIB1 may include cell-specific configuration information (PDCCH-ConfigCommon) about a PDCCH, and PDCCH-ConfigCommon may include information (also referred to as "ControlResourceSetZero," and the like) used for the configuration of CORESET #0. The UE may configure CORESET #0, based on at least one of the number of RBs ($N^{CORESET}_{RB}$), the number of symbols ($N^{CORESET}_{symb}$), and an offset, associated with an index indicated by ControlResourceSetZero as described in FIG. 1.

Alternatively, (3) the UE may determine information about above-described CORESET #0, based on an index indicated by a parameter (for example, controlResourceSetZero) in PDCCH-ConfigCommon which is RRC-signaled (included in an RRC reconfiguration message) specific to the UE.

Figure 3:
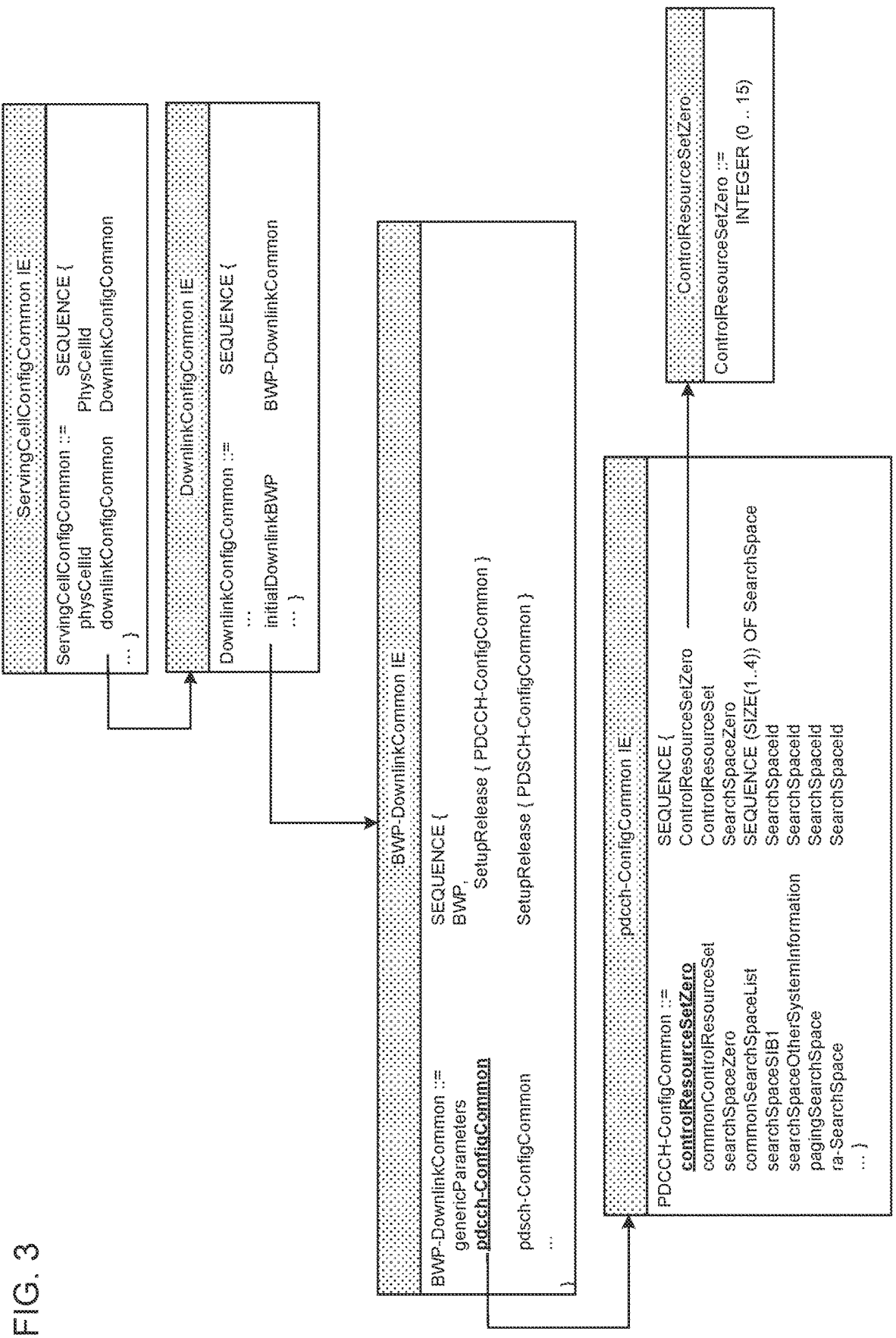
FIG. 3 is a diagram to show an example of a configuration of CORESET #0 based on an RRC reconfiguration message.

FIG. 3 is a diagram to show an example of a configuration of CORESET #0 based on an RRC reconfiguration message. Note that parameters in the RRC reconfiguration message and the hierarchy structure of the parameters shown in FIG. 3 are only examples, and some parameters (layers) may be omitted or may be added.

As shown in FIG. 3, configuration information (ServingCellConfigCommon) specific to a serving cell (cell, component carrier) in the RRC reconfiguration message may include configuration information (DownlinkConfigCommon) that is common to the downlink. DownlinkConfigCommon may include information (initialDownlinkBWP) related to an initial downlink BWP. For the initial downlink BWP, a cell-specific common parameter (BWP-DownlinkCommon) may be provided.

BWP-DownlinkCommon may include cell-specific configuration information (PDCCH-ConfigCommon) about a PDCCH, and PDCCH-ConfigCommon may include information (also referred to as "ControlResourceSetZero," and the like) used for the configuration of CORESET #0. The UE may configure CORESET #0, based on at least one of the number of RBs ($N^{CORESET}_{RB}$), the number of symbols ($N^{CORESET}_{symb}$), and an offset, associated with an index indicated by ControlResourceSetZero as described in FIG. 1.

Incidentally, the UE is able to not configure CORESET #0, based on pdcch-ConfigSIB1 in the MIB. For example, if the SIB1 (RMSI) is not transmitted in a cell (for example, secondary cell) for NR of non-standalone (NSA) (for example, EN-DC (E-UTRA-NR Dual Connectivity), NE-DC (NR-E-UTRA Dual Connectivity), and the like), the UE may not configure CORESET #0, based on pdcch-ConfigSIB1 in the MIB.

If CORESET #0 is not configured based on pdcch-ConfigSIB1 in the MIB, the pdcch-ConfigSIB1 may be used for another application. For example, pdcch-ConfigSIB1 may be used for the designation of a frequency location where the UE may find an SSB with the SIB1 or a frequency range (FR) where the network does not provide an SSB with the SIB1.

If CORESET #0 is not configured based on pdcch-ConfigSIB1 in the MIB, the value ($K_{SSB}$) determined based on a predetermined parameter (for example, Ssb-subcarrierOffset) in the MIB may indicate that the SIB1 does not exist, or indicate that CORESET #0 is not configured based on the MIB (in other words, pdcch-ConfigSIB1 is used for another application).

Here, Ssb-subcarrierOffset is a parameter indicating an offset or a frequency domain between the SSB and the overall resource block grid in the number of subcarriers. $K_{SSB}$ is a value determined based on Ssb-subcarrierOffset and predetermined bits in the PBCH payload. For example, the predetermined bits (for example, 4 MSBs) of $K_{SSB}$ may be constituted of Ssb-subcarrierOffset, and the remaining bits (for example, 1 LSB) of $K_{SSB}$ may be predetermined bits in the PBCH payload. $K_{SSB}$ may indicate a subcarrier offset for subcarrier 0 of the SSB from subcarrier 0 of the common resource block $N^{SSB}_{CRB}$. $N^{SSB}_{CRB}$ may be determined based on a higher layer parameter. For example, $N^{SSB}_{CRB}$ may be determined based on a higher layer parameter (offsetToPointA) broadcasted in the SIB1 for primary cells (PCell), and may be determined by a higher layer parameter (absoluteFrequencyPointA) notified in RRC reconfiguration (RRCreconfiguration) message for other primary secondary cells (PSCell), and secondary cells (SCell). Using reserved bits (particular code points) of $K_{SSB}$, whether or not CORESET #0 is configured based on pdcch-ConfigSIB1 in the MIB may be notified to the UE.

On the other hand, it is assumed that the UE determines at least one (frequency location/bandwidth) of location of a frequency domain and a bandwidth (the number of PRBs) of the above-mentioned CSS, based on CORESET #0. Thus, if the UE does not configure CORESET #0 based on pdcch-ConfigSIB1 in the MIB, it is necessary to configure CORESET #0 based on a parameter (for example, controlResourceSetZero) in pdcch-ConfigCommon shown in FIG. 2 or FIG. 3.

However, it is not mandatory but an option that pdcch-ConfigCommon (for example, FIG. 2) in the SIB1 or pdcch-ConfigCommon (for example, FIG. 3) in the RRC reconfiguration message includes a parameter (for example, controlResourceSetZero) for the configuration of CORESET #0.

Thus, the UE may not judge appropriately which to refer to pdcch-ConfigSIB1 in the MIB or the parameter in PDCCH-ConfigCommon to configure CORESET #0. In this case, as a result that the UE cannot configure CORESET #0 appropriately, the UE may not determine frequency location/bandwidth for the CSS appropriately.

Then, the innovators of the present invention came up with the idea of determining the MIB or pdcch-ConfigCommon to use to configure CORESET #0 based on a value (for example, $k_{SSB}$) determined based on a predetermined parameter (for example, Ssb-subcarrierOffset) in the MIB.

One embodiment of the present disclosure will be described in detail with reference to the drawings as follows. Note that the present embodiment may be applied to standalone of NR as well as NSA. In the following, CORESET #0 assumes a CORESET for the type 0-PDCCH CSS, but CORESET #0 may be a CORESET for any types of the above-described CSSs without being limited to this.

In the following, an example is described where the "parameter in the MIB" used for the determination of the MIB or pdcch-ConfigCommon to use to configure CORESET #0 is Ssb-subcarrierOffset, but the "parameter in the MIB" may be another parameter in the MIB without being limited to this.

In the following, it is assumed that the "parameter in the MIB" used for the determination of CORESET #0 is pdcch-ConfigSIB1, but the "parameter in the MIB" may be another parameter in the MIB without being limited to this. It is assumed that the "parameter included in the cell-specific configuration information about the PDCCH" used for the determination of CORESET #0 is controlResourceSetZero in pdcch-ConfigCommon, but the "parameter included in the cell-specific configuration information about the PDCCH" may be any parameter included in the SIB1 or the RRC reconfiguration message without being limited to this.

Radio Communication Method

In the radio communication method according to one embodiment of the present disclosure, the UE receives a master information block (MIB) in a cell. The UE determines the MIB or pdcch-ConfigCommon to use to configure CORESET #0, based on a frequency range (FR) of a cell and $K_{SSB}$ determined based on Ssb-subcarrierOffset in the MIB.

Figure 4:
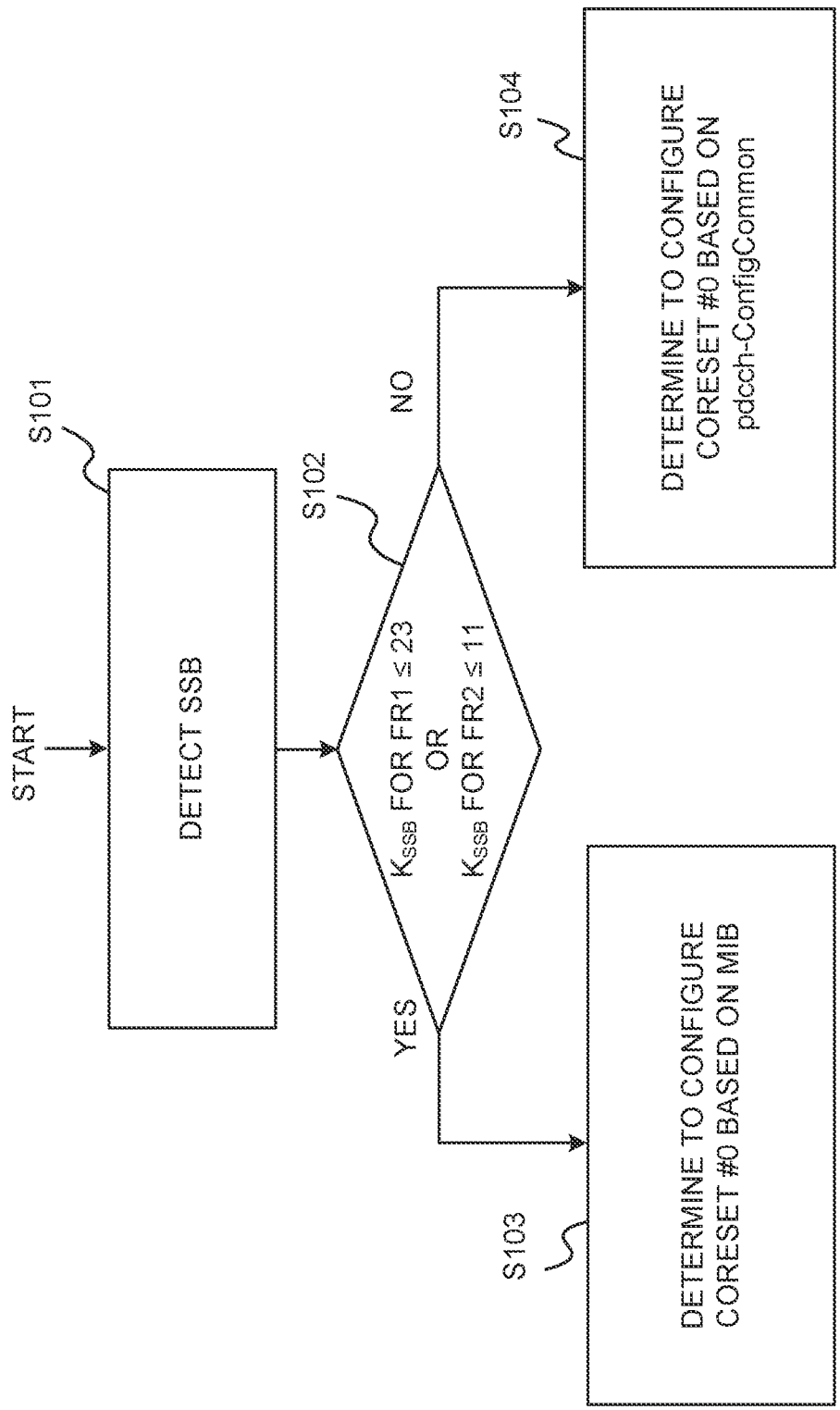
FIG. 4 is a flowchart to show an example of a configuration of CORESET #0 according to one embodiment.

FIG. 4 is a flowchart to show an example of a configuration of CORESET #0 according to one embodiment. In step S101 of FIG. 4, an SSB is detected in a certain cell. The UE acquires an MIB broadcasted through a PBCH in the SSB.

In step S102, $k_{SSB}$ determined based on an FR and Ssb-subcarrierOffset in the MIB is determined. Here, the FR may include FR1 and FR2. The FR1 may be a frequency band (a first frequency band) which is lower than 6 GHz. The FR2 may be a frequency band (a second frequency band which is higher than the first frequency band) which is higher than 6 GHz. The FR2 may be a frequency band which is higher than 24 GHz, and may be referred to as "millimeter wave," and the like.

If $k_{SSB}$ is equal to or less than a predetermined threshold value for each FR (for example, $k_{SSB}$ for the FR1 is equal to or less than 23, or $k_{SSB}$ for the FR2 is equal to or less than 11), the UE, in step S103, may determine to configure CORESET #0 based on pdcch-ConfigSIB1 (for example, FIG. 1) in the MIB (in other words, CORESET #0 exists in the MIB).

Specifically, the UE may configure the number of contiguous resource blocks and the number of contiguous symbols of CORESET #0, based on a predetermined number of MSS (for example, 4 MSBs) in pdcch-ConfigSIB1 (for example, see a table shown in FIG. 1). The UE may determine monitoring occasion of a PDCCH, based on a predetermined number of LSE (for example, 4 LSBs) in pdcch-ConfigSIB1.

On the other hand, if $k_{SSB}$ is greater than a predetermined threshold value for each FR (for example, $k_{SSB}$ for the FR1 is greater than 23, or $k_{SSB}$ for the FR2 is greater than 11), the UE, in step S104, may determine to configure CORESET #0 based on controlResourceSetZero (for example, FIG. 2 or 3) in pdcch-ConfigCommon (in other words, CORESET #0 does not exist in the MIB, and CORESET #0 exists in pdcch-ConfigCommon).

Specifically, the UE may configure the number of contiguous resource blocks and the number of contiguous symbols of CORESET #0, based on controlResourceSetZero in pdcch-ConfigCommon (for example, see a table shown in FIG. 1). The UE may determine monitoring occasion of a PDCCH, based on controlResourceSetZero in pdcch-ConfigCommon.

Note that, for example, the determination shown in FIG. 4 may be performed in initial cell selection.

FIG. 5 illustrates diagrams to show examples of $k_{SSB}$. FIG. 5A indicates an example of $K_{SSB}$ for the FR1, and FIG. 5B indicates an example of $K_{SSB}$ for the FR2. If the UE detects the first SSB and $K_{SSB}$ for the FR1 is greater than the above-described predetermined threshold value (for example, equal to or greater than 24 and equal to or less than 29), or if $K_{SSB}$ for the FR2 is greater than the above-described predetermined threshold value (for example, equal to or greater than 12 and equal to or less than 13), the UE, in above-mentioned step 104, determines that CORESET #0 does not exist in the MIB.

In this case, the UE may refer to a table shown in FIG. 5A or 5B, and, based on an offset ($N^{Offset}_{GSCN}$) of a global synchronization channel number (GSCN) to be given associated with $K_{SSB}$, may determine GSCN nearest the second SSB having CORESET #0 in a frequency direction. Note that the GSCN may indicate the location of a synchronization raster.

According to the above-described radio communication method, based on a value (for example, $k_{SSB}$) determined based on a predetermined parameter (for example, Ssb-subcarrierOffset) in the MIB, the MIB or pdcch-ConfigCommon to use to configure CORESET #0 can be determined appropriately, and CORESET #0 can be configured appropriately.

Radio Communication System

Hereinafter, a structure of a radio communication system according to one embodiment of the present disclosure will be described. In this radio communication system, any of the radio communication methods according to each embodiment of the present disclosure described above may be used alone or may be used in combination for communication.

Figure 6:
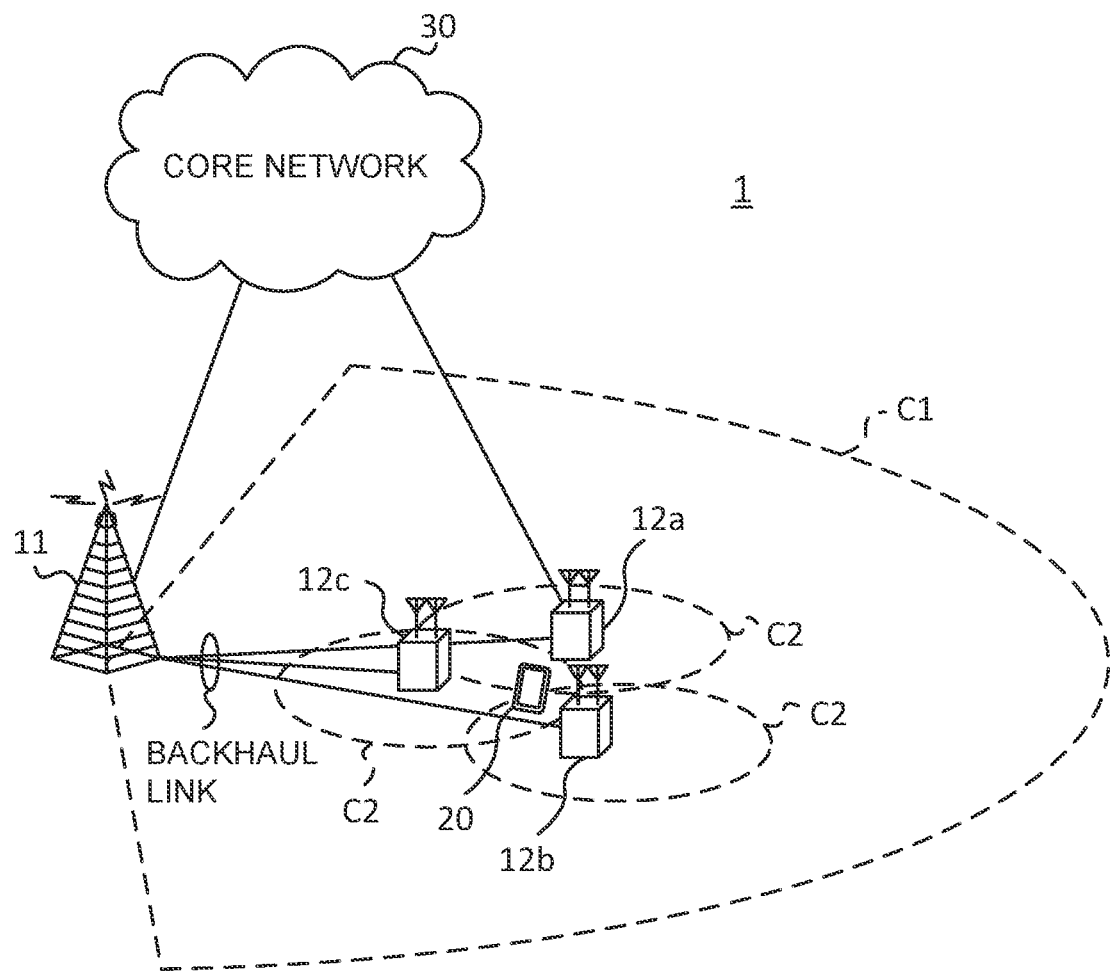
FIG. 6 is a diagram to show an example of a schematic structure of a radio communication system according to one embodiment.

FIG. 6 is a diagram to show an example of a schematic structure of the radio communication system according to one embodiment. The radio communication system 1 may be a system implementing a communication using LTE (Long Term Evolution), 5G NR (5th generation mobile communication system New Radio) and so on the specifications of which have been drafted by 3GPP (Third Generation Partnership Project).

The radio communication system 1 may support dual connectivity (multi-RAT dual connectivity (MR-DC)) between a plurality of RATs (Radio Access Technologies). The MR-DC may include dual connectivity (EN-DC (E-UTRA-NR Dual Connectivity)) between LTE (E-UTRA (Evolved Universal Terrestrial Radio Access)) and NR, dual connectivity (NE-DC (NR-E-UTRA Dual Connectivity)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NN-DC (NR-NR Dual Connectivity)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, or the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality or base stations 10. The user terminal 20 may use at least one of carrier aggregation and dual connectivity (DC) using a plurality of component carriers (CCs).

Each CC may be included in at least one of a first frequency band (FR1 (Frequency Range 1)) and a second frequency band (FR2 (Frequency Range 2)). The macro cell C1 may be included in FR1, and the small cells C2 may be included in FR2. For example, FR1 may be a frequency band of 6 Ghz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the CPRI (Common Public Radio Interface), the X2 interface and so on) or a wireless connection (for example, an NR communication). For example, if an NR communication is used as a backhaul between the base stations 11 and 12, the base station 11 corresponding to a higher station may be referred to as an "IAB (Integrated Access Backhaul) donor," and the base station 12 corresponding to a relay station (relay) may be referred to as an "IAB node."

The base station 10 may be connected to a core network 30 through another base station 10 or directly. For example, the core network 30 may include at least one of EPC (Evolved Packet Core), 5GCN (5G Core Network), NGC (Next Generation Core), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), CP-OFDM (Cyclic Prefix OFDM), DFT-s-OFDM (Discrete Fourier Transform Spread OFDM), OFDMA (Orthogonal Frequency Division Multiple Access), SC-FDMA (Single Carrier Frequency Division Multiple Access), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (PDSCH (Physical Downlink Shared Channel), which is used by each user terminal 20 on a shared basis, a broadcast channel (PBCH (Physical Broadcast Channel)), a downlink control channel (PDCCH (Physical Downlink Control Channel)) and so on, may be used as downlink channels.

In the radio communication system 1, an uplink shared channel (PUSCH (Physical Uplink Shared Channel), which is used by each user terminal 20 on a shared basis, an uplink control channel (PUCCH (Physical Uplink Control Channel)), a random access channel (PRACH (Physical Random Access Channel)) and so on may be used as uplink channels.

User data, higher layer control information, SIBs, and the like (System Information Blocks) are communicated on the PDSCH. User data, higher layer control information and so on may be communicated on the PUSCH. The MIBs (Master Information Blocks) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data."

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One SS may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Transmission confirmation information (for example, which may be also referred to as HARQ-ACK (Hybrid Automatic Repeat reQuest), ACK/NACK, and so on) of channel state information (CSI), scheduling request (SR), and so on may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on are communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SSB (SS Block)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

Base Station

Figure 7:
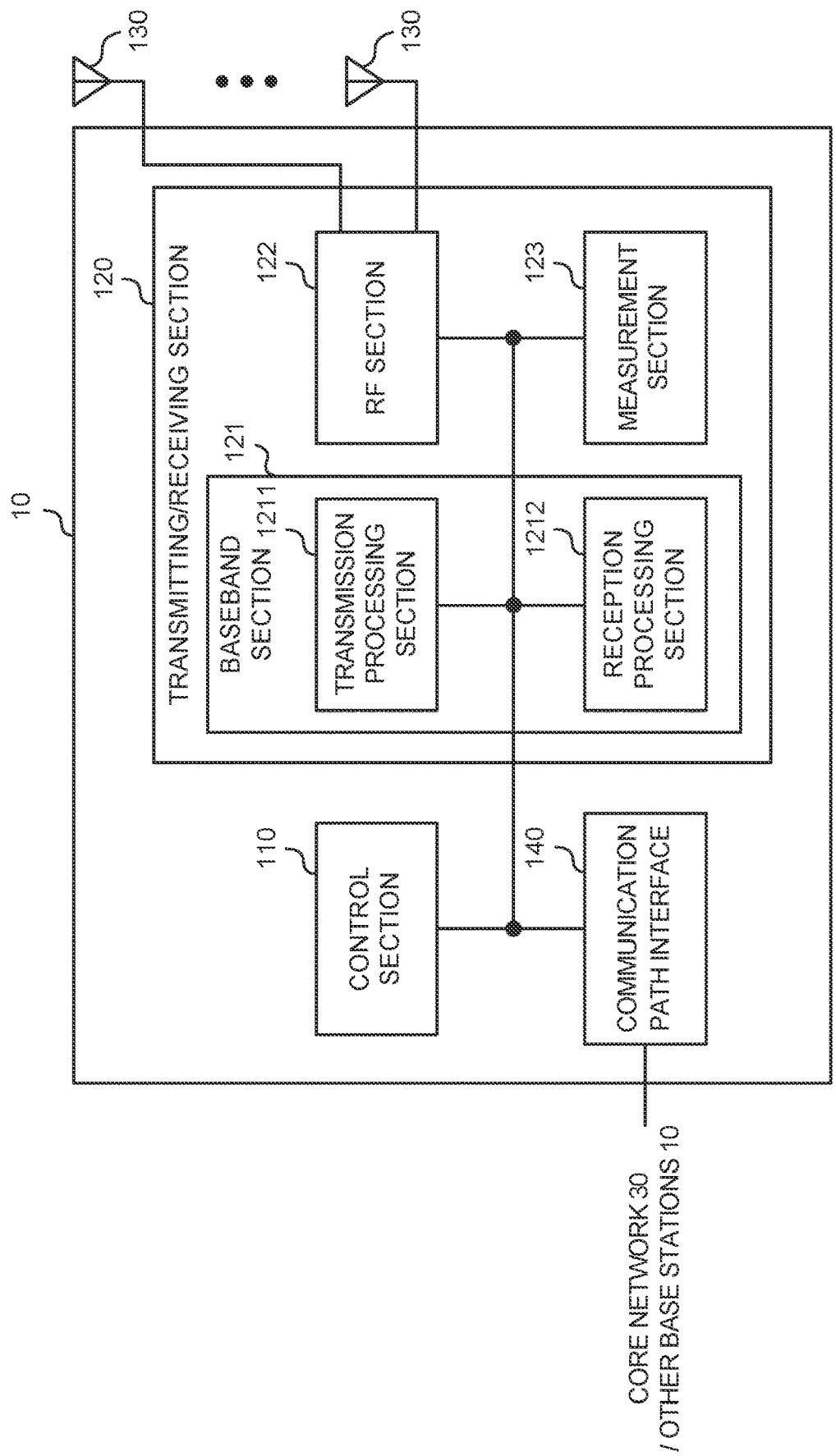
FIG. 7 is a diagram to show an example of a structure of a base station according to one embodiment.

FIG. 7 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing, and so on) for communication channels, manage the state of the base station 10, manage the radio resources, and the like.

The transmitting/receiving section 120 may include a baseband section 121, an RF (Radio Frequency) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may performs the processing of the PDCP (Packet Data Convergence Protocol) layer, the processing of the RLC (Radio Link Control) layer (for example, RLC retransmission control), the processing of the MAC (Medium Access Control) layer (for example, HARQ retransmission control), and so on, for example, on data and control information and so on acquired from the control section 110, and may generate bit string to transmit.

The transmitting/receiving section 120 (transmission processing section 1211) may performs transmission processing such as channel coding (which may include error correction coding), modulation, mapping, filtering, discrete Fourier transform (OFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform RPM (Radio Resource Management) measurement, CSI (Channel State Information) measurement, and so on, based on the received signal. The measurement section 123 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the transmitting/receiving section 120 may transmit at least one of a master information block (MIB), a system information block (SIB) 1, and an RRC reconfiguration message in a cell.

The control section 110 may determine the MIB or cell-specific configuration information about a downlink control channel to use to configure a control resource set for a common search space, based on a frequency range of the cell and a value (for example, $K_{SSB}$) determined based on a first parameter in the MIB.

If the value determined based on the first parameter is equal to or less than a predetermined threshold value prescribed for the each frequency range, the control section 110 may configure the control resource set based on a second parameter in the MIB.

If the value determined based on the first parameter is greater than the predetermined threshold value prescribed for the each frequency range, the control section 110 may configure the control resource set based on a parameter in the cell-specific configuration information.

User Terminal

Figure 8:
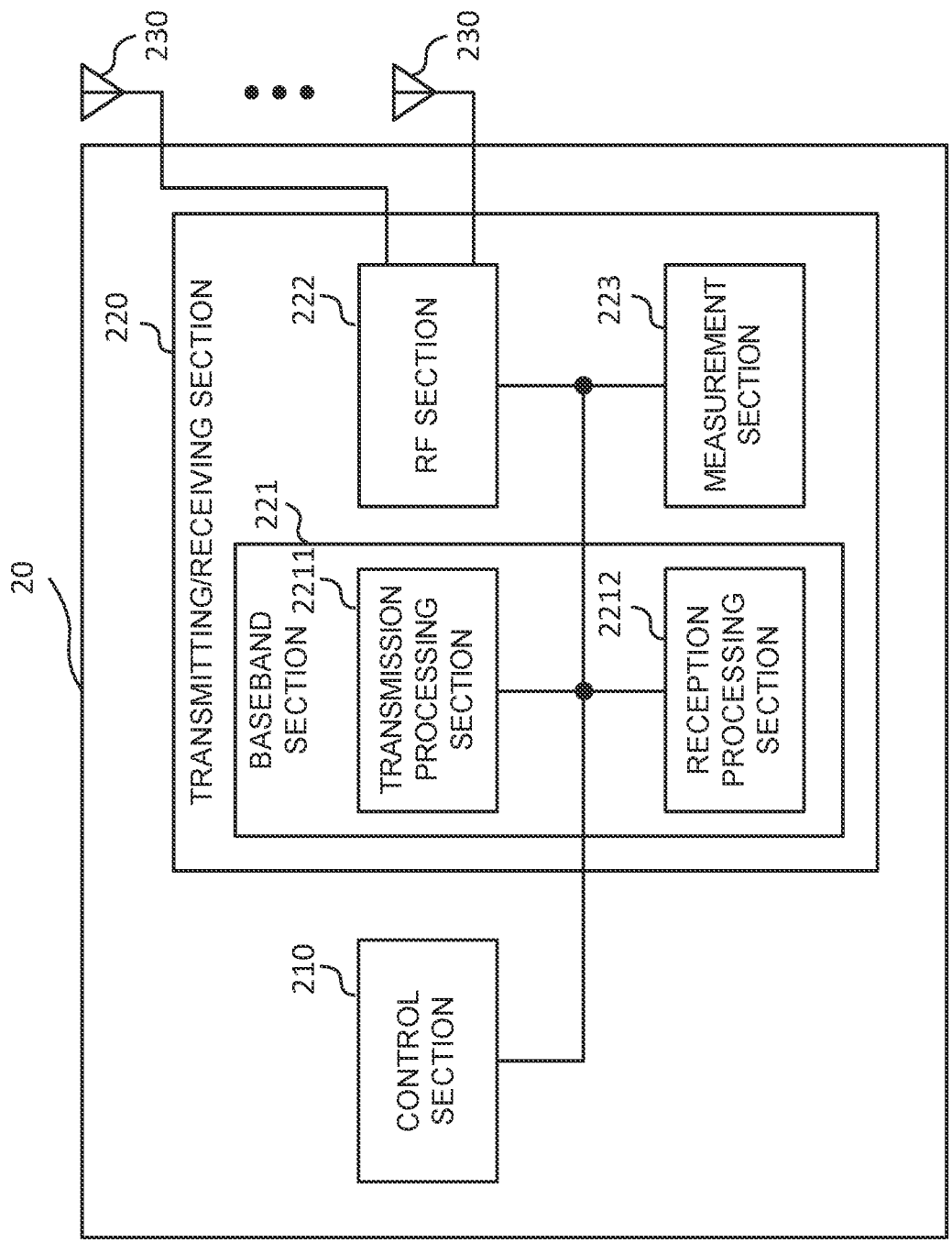
FIG. 8 is a diagram to show an example of a structure of a user terminal according to one embodiment.

FIG. 8 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part or the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmission section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may performs the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may performs transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the transmission line interface 240.

Note that the transmitting/receiving section 220 may receive at least one of a master information block (MIB), a system information block (SIB) 1, and an RRC reconfiguration message in a cell.

The control section 210 may determine the MIB or cell-specific configuration information about a downlink control channel to use to configure a control resource set for a common search space, based on a frequency range of the cell and a value (for example, $K_{SSB}$) determined based on a first parameter in the MIB.

If the value determined based on the first parameter is equal to or less than the predetermined threshold value prescribed for the each frequency range, the control section 210 may configure the control resource set based on the second parameter in the MIB.

If the value determined based on the first parameter is greater than the predetermined threshold value prescribed for the each frequency range, the control section 210 may configure the control resource set based on a parameter in the cell-specific configuration information.

The control section 210 may determine an offset of a frequency domain between synchronization signal blocks and overall resource blocks indicated by a number of subcarriers, based on the first parameter.

The control section 210 may determine at least one of a number of resource blocks and a number of symbols in the control resource set, based on the second parameter.

The cell-specific configuration information may be included in system information block 1 or a radio resource control (RRC) reconfiguration message.

Hardware Structure

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but functions are by no means limited to these. For example, functional block (components) to implement a function of transmission may be referred to as a "transmitting section (transmitting unit)," a "transmitter," and the like. The method for implementing each component is not particularly limited as described above.

Figure 9:
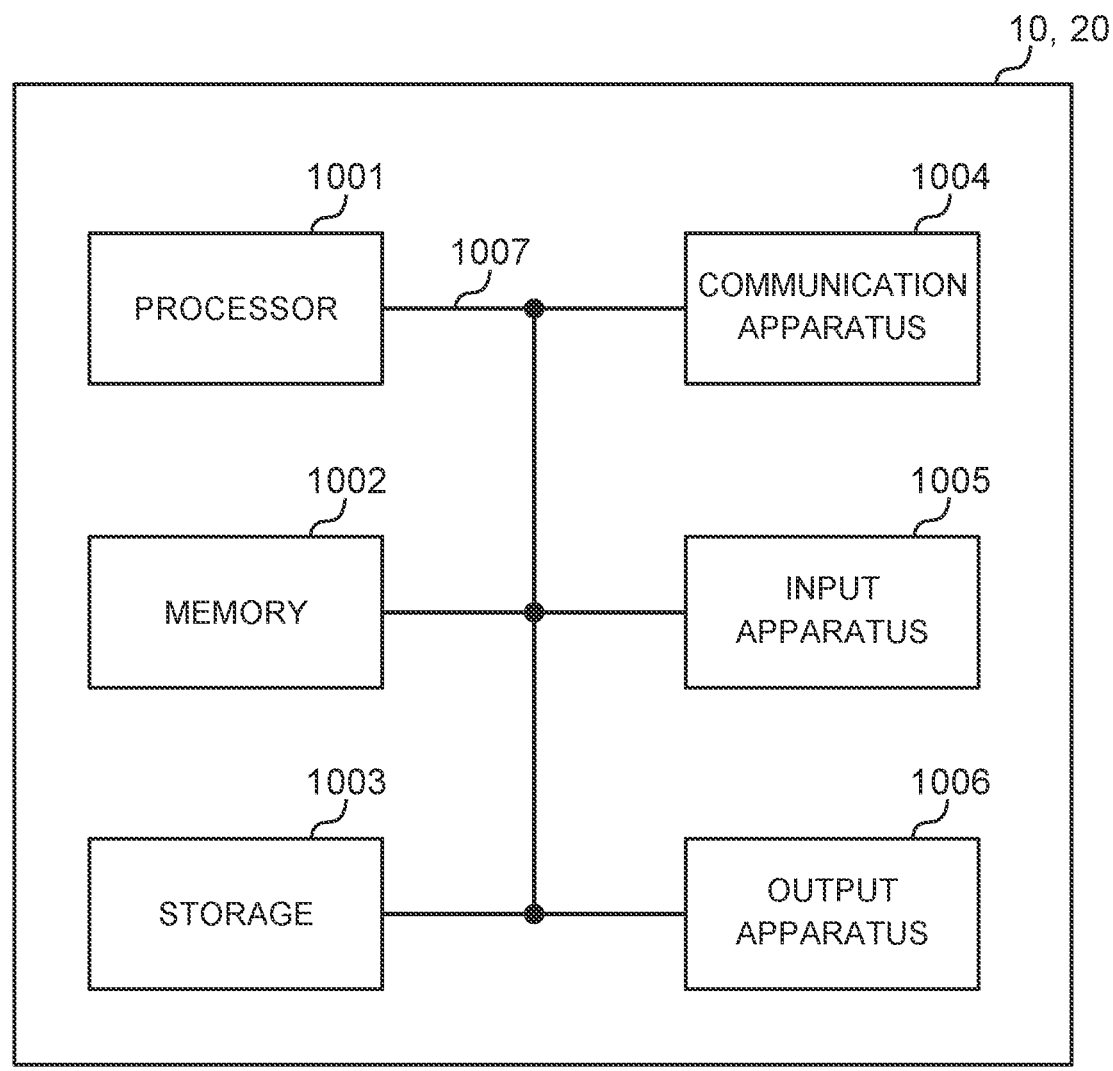
FIG. 9 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 9 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing predetermined software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an ASIC (Application-Specific Integrated Circuit), a PLD (Programmable Logic Device), an FPGA (Field Programmable Gate Array), and so on, and part or all of the functional blocks ray be implemented by the hardware. For example, the processor 1001 may be implemented with at least one of these pieces of hardware.

VARIATIONS

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency," and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mind-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mind-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mind-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, codewords, or the like, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (PRB (Physical RB))," a "subcarrier group (SCG)," a "resource element group (REG)," a "PRB pair," an "RB pair," and so on.

Furthermore, a resource block may be constituted of one or a plurality of resource elements (REs). For example, one RE may correspond to a radio resource field or one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a BWP for the UL (UL BWP) and a BWP for the DL (DL BWP). One or a plurality of BWPs may be configured in one carrier for a UE.

At least one of configured BWPs may be active, and a UE does not need to assume to transmit/receive a predetermined signal/channel outside active BWPs. Note that a "cell," a "carrier," and so on in the present disclosure may be interpreted as a "BWP."

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to predetermined values, or may be represented in another corresponding information. For example, radio resources may be specified by predetermined indices.

The names used for parameters and so on in the present disclosure are in no respect limiting. Furthermore, mathematical expressions that use these parameters, and so on may be different from those expressly disclosed in the present disclosure. Since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of predetermined information (for example, reporting of "X holds") does not necessarily have to be reported explicitly, and can be reported implicitly (by, for example, not reporting this predetermined information or reporting another piece of information).

Determinations may be made in values represented by one bit (0 or 1), may be made in Boolean values that represent true or false, or may be made by comparing numerical values (for example, comparison against a predetermined value).

Software, whether referred to as "software," "firmware," "middleware," "microcode," or "hardware description language," or called by other names, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding wait)," "quasi-co-location (QCL)," a "TCI state (Transmission Configuration Indication state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," "fixed station," a "NodeB," an "eNodeB (eNB)," a "gNodeB (gNB)," an "access point," a "transmission point (TP)," a "reception point (RP)," a "transmission/reception point (TRP)," a "panel," a "cell," "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an IoT (Internet of Things) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "D2D (Device-to-Device)," "V2X (Vehicle-to-Everything)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Lone Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NE (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling, between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives a master information block (MIB); and
   a processor that determines a configuration of control resource set for a common search space based on a frequency range and a value that is determined based on a first parameter within the MIB,
   wherein if the value that is determined based on the first parameter is less than or equal to a threshold value determined for the frequency range, the processor configures the control resource set based on a second parameter within the MIB, and
   wherein if the value that is determined based on the first parameter is greater than a threshold value determined for the frequency range, the processor configures the control resource set based on a third parameter within cell-specific configuration information of a downlink control channel.

2. The terminal according to claim 1, wherein the processor determines at least one of a number of resource blocks and a number of symbols in the control resource set based on the second parameter.

3. The terminal according to claim 2, wherein the processor determines, based on the first parameter, a subcarrier offset from subcarrier 0 in a common resource block to subcarrier 0 of a synchronization signal block.

4. The terminal according to claim 1, wherein the cell-specific configuration information is included in a system information block 1 (SIB1) or a radio resource control (RRC) reconfiguration message.

5. The terminal according to claim 4, wherein the processor determines, based on the first parameter, a subcarrier offset from subcarrier 0 in a common resource block to subcarrier 0 of a synchronization signal block.

6. The terminal according to claim 1, wherein the processor determines, based on the first parameter, a subcarrier offset from subcarrier 0 in a common resource block to subcarrier 0 of a synchronization signal block.

7. A radio communication method for a terminal comprising:
   receiving a master information block (MIB); and
   determining a configuration of control resource set for a common search space based on a frequency range and a value that is determined based on a first parameter within the MIB,
   wherein if the value that is determined based on the first parameter is less than or equal to a threshold value determined for the frequency range, then configuring the control resource set based on a second parameter within the MIB, and
   wherein if the value that is determined based on the first parameter is greater than a threshold value determined for the frequency range, then configuring the control resource set based on a third parameter within cell-specific configuration information of a downlink control channel.

8. A radio communication system including:
a radio base station comprising:
   a transmitter that transmits a master information block (MIB); and
a terminal comprising:
   a receiver that receives the MIB; and
   a processor that determines a configuration of control resource set for a common search space based on a frequency range and a value that is determined based on a first parameter within the MIB,
   wherein if the value that is determined based on the first parameter is less than or equal to a threshold value determined for the frequency range, the processor configures the control resource set based on a second parameter within the MIB, and
   wherein if the value that is determined based on the first parameter is greater than a threshold value determined for the frequency range, the processor configures the control resource set based on a third parameter within cell-specific configuration information of a downlink control channel.

* * * * *